Jan. 8, 1957 J. D'A. CLARK 2,776,686
CROSSCUT FIBER AND METHOD FOR ITS PREPARATION
Original Filed March 23, 1953 2 Sheets-Sheet 1

INVENTOR:
James d'A. Clark,
BY Ooms, McDougall,
Williams & Hersh
ATTORNEYS.

Jan. 8, 1957  J. D'A. CLARK  2,776,686
CROSSCUT FIBER AND METHOD FOR ITS PREPARATION
Original Filed March 23, 1953  2 Sheets-Sheet 2

INVENTOR:
James d'A. Clark,
by Ooms, McDougall,
Williams & Hersh
Attorneys

United States Patent Office 2,776,686
Patented Jan. 8, 1957

2,776,686

CROSSCUT FIBER AND METHOD FOR ITS PREPARATION

James d'A. Clark, Victoria, British Columbia, Canada, assignor to Changewood Corporation, Chicago, Ill., a corporation of Illinois Original application March 23, 1953, Serial No. 344,089. Divided and this application July 18, 1956, Serial No. 598,706

4 Claims. (Cl. 144—309)

This invention relates to a new and improved wood particle and it relates particularly to a woody fibrous element and method for manufacturing same, and to a consolidated product manufactured therefrom and method for manufacturing same.

This is a division of my copending application Serial No. 344,089, filed March 23, 1953, and entitled "Crosscut Fiber and Method for its Preparation."

In Patent No. 2,689,092, description is made of the manufacture of a fiber flake or wafer cut crosswise tangentially to the grain of the wood and having end faces formed at right angles to the sides and to the top and bottom faces of the wafer. Unless such flakes or wafers are cut undesirably thin, the abrupt vertical end faces of the wafers cause undesirable zones or lines of weakness throughout the structure molded therefrom. This is particularly evident with harder woods and woods having hard summer wood annual rings, such as are found in Southern Pines. Moreover, on the broad faces of well compacted structures molded therefrom and particularly where the end of one wafer overlaps the face of another, there exists an undesirable linear depression which not only constitutes a line of weakness upon flexure but presents an unattractive appearance and provides a crevice wherein dirt may lodge. The side portions of flakes of this type do not present the same difficulties because the side surfaces are predominantly parallel to the annual rings which are usually at an acuate angle to the broad surfaces. Further, by being parallel to the grain, the side faces and edges are more pliable laterally than are the end faces and edges. Consequently, the juncture between the side edges and the underlying element does not become obvious nor objectionable in the molded structure.

An object of this invention is to provide an improved wood fiber or flake suitable for manufacturing molded fibrous products.

Another object is to provide fibers or flakes of woody material characterized by their ability to form a smooth, continuous unbroken surface and which become well joined with underlying fibrous elements during molding into a consolidated product.

A further object is to provide a method for producing wafers suitable for forming into strong and attractive consolidated products by the use of brittle woody material, such as kiln dried lumber.

Another object is to provide a method of producing woody flakes or wafers of predetermined thickness and length with ends of the flakes tapered or wedge shaped.

A still further object is to produce a strong consolidated fibrous product of high density having a substantially unbroken surface by the use of woody flakes or wafers advantageously shaped and thinly coated with resinous material.

These and other objects and advantages of this invention will hereinafter appear and for purposes of illustration, but not of limitation, an embodiment of the invention is shown in the accompanying drawings, in which—

In accordance with this invention, wafers or flakes are cut from a wooden block by cutting into the block of wood parallel to the length of fibers in the wood preferably by feeding the block of wood towards a moving cutting edge substantially perpendicularly to its path and with a cutting movement transverse said length to form wafers having a thickness corresponding to the depth of cut by scoring the wood with angular cuts in the direction of cutting movement. For this purpose, wafers or flakes are cut from a wooden block by knife elements which are arranged substantially parallel to the length of the fibers during cutting operations to form the broad faces while the end faces are severed at acute angles with the broad faces to impart the desired taper and flexibility to the ends for the purpose of enabling the manufacture of a strong, smooth-faced consolidated product. By feeding the block perpendicularly to the path of the cutting edge the wafers or flakes produced will have parallel broad faces.

Figure 3:
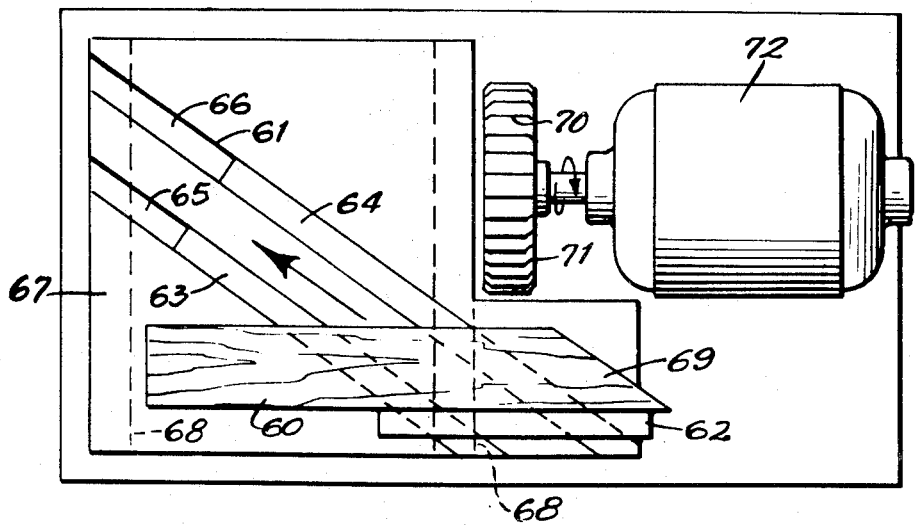
Figure 3 is an elevational view of another modification in an apparatus for preparing wafers and the like and embodying features of this invention.
Figure 4:
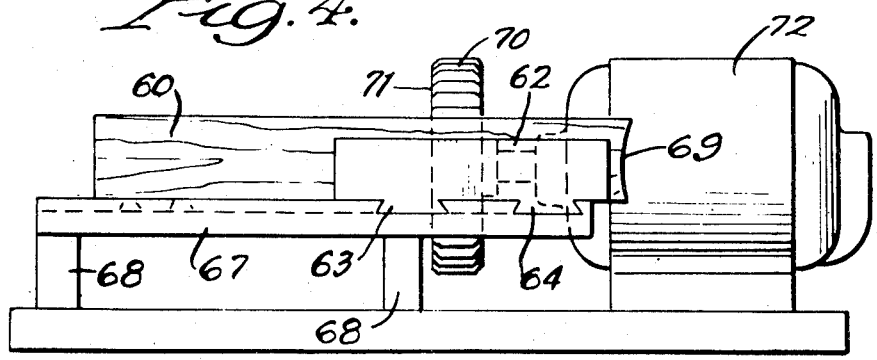
Figure 4 is a plan view of the apparatus shown in Figure 3.

As illustrated in Figures 3 and 4, a block of wood 60 is positioned on a slide 61 in advance of an upright actuating member 62 having spaced depending tongues 63 and 64 which operate in corresponding grooves 65 and 66, respectively, in the slide bed 67. The slide bed is supported by spaced uprights 68.

Upon actuation of the wooden block in the slanting direction defined by the slides, end portion 69 of the block outlined by broken lines is progressively shaved or cut off by the knives 70 arranged about the periphery of a cutting wheel 71 driven by a motor 72 to effect a cutting movement transverse to the length of the fibers in the block of wood and parallel thereto to form wafers having a thickness corresponding to the depth of cut. So as to avoid step cuts by the succession of knives 70 thereby forming wafers with vertical ends, the extreme corners of the cutting edges adjacent the block are bevelled parallel to the slides 61. The angular relation between the slides and the axis of the cutting wheel then defines the taper of the ends of the wafers cut. The length of the wafers cut will correspond to the width of the knives at their cutting edges—the width of the wafers to the natural split which takes place with the grain or, if not split, to the thickness of the block of wood.

Figure 1:
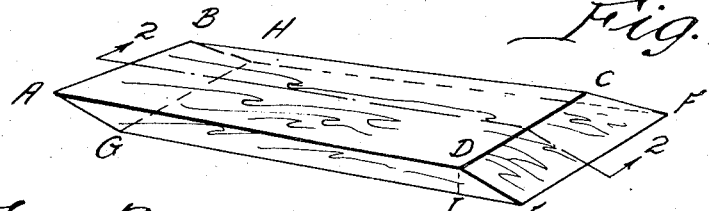
Figure 1 is a perspective view of a woody flake produced in accordance with this invention.
Figure 2:
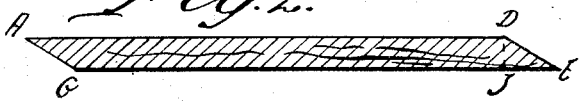
Figure 2 is a sectional view taken along the line 2—2 of Figure 1.

Wafers or elements produced in accordance with this invention, exemplified in Figures 1 and 2, have wedge-shaped ends formed by end faces ABHG or CDFE, a controlled thickness DJ, length AD and width DC, the end faces making an acute angle DAG or DEG with the top and bottom faces ABCD or HFEG.

In general, the side faces ADEG and BDFH will be neither flat nor exactly parallel to the length of the fibers because they will usually constitute fractured surfaces along natural striae as those between the annual rings in wood. However, either face may have been a part of the outer face of the billet of wood from which the wafer was cut. This absence of parallelism or regularity between the pairs of side faces of the majority of the wafers and the parallelism of each side face with the adjacent annual ring in the wood, serves in part to distinguish wafers made in accordance with this invention from others. For example, it is understood that thin decorative wafers have been sliced obliquely from the end of a stick of wood with the grain running the short way. In such a case, except for inadvertent fractures the end and side faces of the wafers so made will comprise parts of the four outer flat faces of the original stock of wood from which they were cut.

When the broad top and bottom surfaces of the wafers have been cut with a knife edge lying parallel to and moving across the direction of the fibers as herein described, the original strength of the fibrous elements in the woody structure is preserved almost intact. If, on the other hand, the cutting edge lies at an angle to or moves in other than a direction substantially perpendicular to the axial direction of the fibers, the resulting wafers, especially if cut from air dry wood, will be more or less checked or cracked across the grain, as is very evident with ordinary planer shavings. The direction in which the faces of fibers have been cut may be determined from microscopic observation, by seeing in which direction lie the scratches made by imperfections in the cutting edges and the direction in which microscopically small fibrous elements have bent while being cut.

Elements or wafers made in accordance with this invention, having a thickness of upwards of 0.002 inch, from 1.0 to 2.0 inches long and of various widths, are particularly suitable for use in preparing a composite molded fibrous structure. This is preferably accomplished by dusting or mixing the wafers with a small percentage of finely powered thermo-active resin, such as phenol formaldehyde, urea formaldehyde, melamine formaldehyde and the like curable thermo-setting resins in an intermediate stage of polymeric growth, and felting the resulting resinous coated wafers into a mat, such as is described in my copending application Ser. No. 110,212, filed August 13, 1949, now Patent No. 2,698,271. The desired resinous concentration in uniform distribution on the surfaces of the wafers can also be accomplished by treating the fibrous elements with resinous solution and dispersion and drying before felting or by the addition of such bonding agents in combination with the felting operation. When using dry powdered resin with wafers of the type described, it has been found that from 2-4 percent resin will produce molded boards having strength properties which are considerably greater than that heretofore secured with 10-40 percent by weight resin added to conventional fine wood fibers or to sawdust. The amount of resin required for molding into a composite board is dependent upon the thickness of wafers and the density of the wood of which they are formed but with the thicker wafers more than 3 percent by weight resin is seldom if ever required. It is believed more accurate to define the resin concentration in relation to the amount present per unit area of fiber surface because of the variation in proportion to the thickness and the density of the wafer. Under such circumstance it has been found that amounts within the range of $\frac{1}{10}$–1 pounds dry resin per 1000 square feet of surface area is sufficient for consolidation to produce boards, which is only a small fraction of the amount heretofore required to produce a molded board of comparable strength with materials of the prior art. Further increases in the amount of resin are not necessary because it does not proportionately increase the strength of the molded product.

Figure 5:
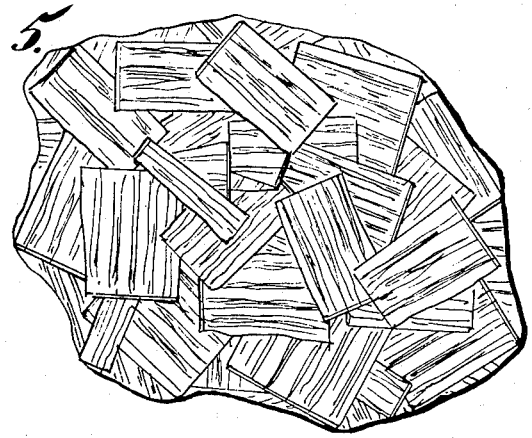
Figure 5 is a fragmentary view of the surface of a composite fibrous structure, made of wafers having their end edges perpendicular to the sides.
Figure 6:
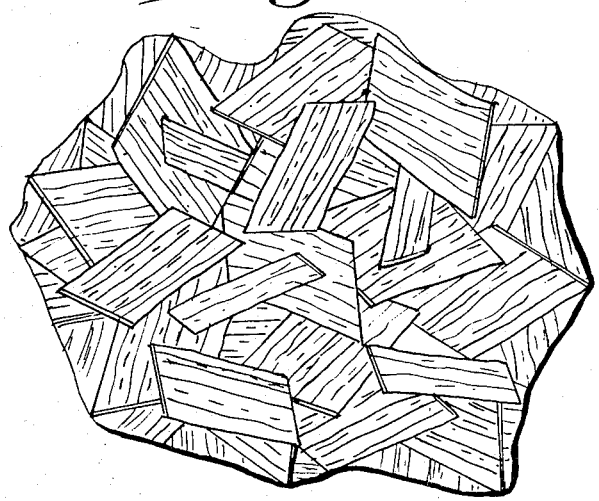
Figures 6 is a fragmentary view of a composite fibrous structure made with wafers having end edges at an oblique angle with the sides.

By way of example, wafers about 0.015 inch thick made in accordance with this invention from a moderately hard wood like Douglas fir are dusted with 3 percent by weight of phenolic resin (minus 200 mesh) (about 0.52 pound per 1,000 square feet of surface area). The resinous coated wafers are felted into a mat and consolidated under pressure of 500 p. s. i. for 5 minutes at 320° F. A ¼ inch board having a density of 1.0 and a modulus of rupture of over 7000 p. s. i. is obtained. If a polished caul is used during the consolidation of molding of the board, the face of the board formed against it is characterized further by having a smooth, glossy surface unmarred by linear depressions at the ends of the wafers. The board is further characterized by substantially all of the visible wafers having their side edges parallel to the grain of the wood, as shown in the fibers by the fragmentary plan views of the boards in Figures 5 and 6.

If the knives cutting the wafers to length are dull, the end edges of the wafers will be ragged. This ragged or scalloped effect of the end edges is often achieved when the surface lamina of a structure composed of wafers having sharp straight end edges, is sanded. Removal of the surface by sanding, of course, removes also the resinous glossy surface.

Particularly when the wafers are cut from hard wood or wood having dense summer wood rings, wafers having ends tapered in thickness give a stronger and considerably smoother surfaced board than do wafers having blunt ends. Furthermore, this tapering of the ends permits a thicker wafer to be used than if the ends were not tapered. In consequence, the specific surface of the fibrous material is reduced and with this proportionately the quantity of resinous binder necessary to make a board having a required strength.

It is to be understood that the apparatus shown and described is to be taken as exemplary only of the method disclosed for producing an improved wafer of high quality and at a comparatively low cost from pieces of woody material that otherwise might be of little value.

It will be further understood that numerous changes may be made in the details of construction, arrangement and operation of the apparatus without departing from the spirit of the invention, especially as defined in the following claims.

I claim:

1. The method of producing fibrous wafers of the type described, including the combination of steps of cutting a block of wood parallel to the lengths of the fibers in the wood with a cutting movement transverse said lengths to form wafers having a thickness corresponding to the depth of cut and tapering the end walls of the wafers with respect to their thickness by cutting the block of wood parallel to the lengths of the fibers in the wood with a cutting movement transverse said lengths concurrently with the movement of the block of wood longitudinally in the direction of the fibers and inclined to the transverse plane of cutting movement.

2. The method of producing wafers as claimed in claim 1 in which the wafers are cut into lengths of 0.5 to 5 inches when measured in the direction of the fibers.

3. The method of producing wafers as claimed in claim 1 in which the wafers are cut into lengths of 0.5 to 2.0 inches in the direction of the fibers.

4. The method of producing wafers as claimed in claim 1 in which the wafers are cut with substantially parallel broad faces.

References Cited in the file of this patent
UNITED STATES PATENTS 2,751,947    Wyss  ----------------  June 26, 1956